US010565540B2

(12) United States Patent
Webb et al.

(10) Patent No.: US 10,565,540 B2
(45) Date of Patent: Feb. 18, 2020

(54) OILFIELD WATER AND WELL MANAGEMENT USING MODELED PREDICTIONS OF OILFIELD WATER PRODUCTION OR HYDROCARBON PRODUCTION

(71) Applicant: SOURCEWATER, INC., Houston, TX (US)

(72) Inventors: Forrest Charles Webb, Evanston, IL (US); Wesley Peter Cleveland, Chicago, IL (US)

(73) Assignee: SOURCEWATER, INC., Houston, TX (US)

( * ) Notice: Subject to any disclaimer, the term of this patent is extended or adjusted under 35 U.S.C. 154(b) by 411 days.

(21) Appl. No.: 14/837,930

(22) Filed: Aug. 27, 2015

(65) Prior Publication Data

US 2016/0063402 A1 Mar. 3, 2016

Related U.S. Application Data

(60) Provisional application No. 62/042,484, filed on Aug. 27, 2014.

(51) Int. Cl.
*G06Q 10/06* (2012.01)

(52) U.S. Cl.
CPC .................. *G06Q 10/067* (2013.01)

(58) Field of Classification Search
None
See application file for complete search history.

(56) References Cited

U.S. PATENT DOCUMENTS

| | | |
|---|---|---|
| 2007/0016389 A1 | 1/2007 | Ozgen |
| 2009/0012765 A1* | 1/2009 | Raphael ................. E21B 43/00 703/10 |
| 2009/0020284 A1 | 1/2009 | Graf et al. |
| 2009/0198478 A1 | 8/2009 | Cuevas et al. |
| 2010/0174517 A1 | 7/2010 | Slupphaug et al. |
| 2011/0060573 A1 | 3/2011 | Cullick et al. |
| 2014/0156806 A1* | 6/2014 | Karpistsenko .......... G06F 16/25 709/219 |

OTHER PUBLICATIONS

Mohaghegh "Reservoir simulation and modeling based on artificial intelligence and data mining (AI&DM)", Journal of Natural Gas Science & Engineering, vol. 3 (2011) pp. 697-705. (Year: 2011).*

(Continued)

*Primary Examiner* — J. H. Hur
(74) *Attorney, Agent, or Firm* — Medler Ferro Woodhouse & Mills PLLC

(57) ABSTRACT

A method for managing oilfield water. Oilfield water data is grouped into discrete and non-overlapping groups. Outliers are removed from the data. Features of the remaining data are analyzed to identify most discriminative feature. The data is separated into training data and testing data, and the training data is fit into a model that shows the best precision, accuracy and recall. The model is confirmed using the testing data. Upon confirmation of the accuracy of the model, the model is applied to data for a new proposed oilfield well, and a new proposed project is implemented or disapproved based on a result of the identified model that predicts water production of the new proposed oilfield well.

21 Claims, 9 Drawing Sheets

(56) References Cited

OTHER PUBLICATIONS

Korean Intellectual Property Office, International Search Report, issued in corresponding Application No. PCT/US2015/047246, dated Nov. 27, 2015.
Canadian Intellectual Property Office, Examiner's Report issued in corresponding Application No. 2959375, dated Dec. 8, 2017.
IP Australia, Examination Report No. 1 issued in corresponding Application No. 2015308842, dated Oct. 19, 2017.

* cited by examiner

OILFIELD WATER AND WELL MANAGEMENT USING MODELED PREDICTIONS OF OILFIELD WATER PRODUCTION OR HYDROCARBON PRODUCTION

CROSS-REFERENCE TO RELATED APPLICATIONS

The present patent application claims benefit of U.S. Provisional Patent Application No. 62/042,484, filed Aug. 27, 2014, the disclosure of which is incorporated herein by reference in its entirety.

BACKGROUND

1. Field of the Disclosure

The present disclosure relates to resource management. More particularly, the present disclosure relates to water management.

2. Background Information

Shale production in recent years has fundamentally reshaped the onshore oil and gas industry and operating models. Operational efficiency is now an imperative for exploration and production (E&P) of new oilfield wells. An oilfield well as used herein refers to a well that has or is capable of producing hydrocarbons as its primary commercial product. Efficient water management has become a critical component of new operating models, driven in part by large volumes of water required for well completions as well as large volumes of flow-back and produced water that are generated over the productive life of an oilfield well. Water-related costs have become a material source of well capital expenditures, and may be on the order of 10-30% of capital expenditures as well as the largest single source of well operating expenditures. While water costs have risen substantially, these costs are often not visible to an operator as water expenditures are seldom grouped comprehensively into a single cost category, but rather spread over drilling, completions, and production budgets. Most operators are not aware of how much is spent on water related costs over the lifecycle of an oilfield well or how oilfield well water may vary across different geographies, well operation practices or well types.

While the role of water in oil and gas operations has risen substantially, the information tools and processes used by most operators to manage decisions relating to water have not. Most exploration and production companies manage water related data in spreadsheets, and important decisions are often made using out of date, fragmented and incomplete data-sets.

As a result of the lack of data management, decisions with significant financial implications are sometimes made using general rules of thumb based on long-held assumptions. Immature processes and tools are sometimes used due in part to the fact that shale development is relatively new in the oil drilling industry. Few exploration and production companies have experience managing shale wells for more than a decade. Rather, shale well developers have focused in the early days on identifying and acquiring good acreage, and then deploying assets in the field as quickly as possible to realize the opportunity. Cost and efficiency considerations have been secondary to this prime objective. This is common in early stages of new markets or a new production method enabled by a fundamental technology shift, such as hydraulic fracturing. However, shale production is becoming a more mature industry, and operational efficiencies are increasingly sought.

As a result of the industry maturation, exploration and production company operators have to ask questions relating to exploration and development such as:
  How does water availability, quality and cost compare to the expected economic benefits of extraction?
  How much water is needed for a drilling plan?
  Where is water sourced from, how much water is available, and what is the quality of available water?
  How much water will be produced in a drilling plan, where will the water be produced, when will the water be produced, and what will be the quality of water and how will the quality change over time?
  What options are there for flow-back and produced water management?
  Where are water disposal assets located, how far are water disposal assets from hydrocarbon wells, and what is the utilization capacity of the water disposal assets?
  What is the cost of treatment per barrel given produced water qualities?

Also as a result of industry maturation, oilfield service providers have to ask questions such as:
  When considering exploration, where is a new well likely to be drilled? What types of flow-back and water production are expected?
  When considering exploration, where should investments in new water management assets and infrastructure go?
  When considering production, where are treatment and disposal assets in relation to the provider's assets?
  When considering production, what is the accessible disposal and treatment capacity within?
  When considering production, what qualities of water are being produced per month and at what volumes? How will this change over time?
  When considering production, under what circumstances is it economical to treat versus dispose of flow-back and produced water?
  When considering production, how can utilization be better balanced across water-related assets in a region?
  When considering production, what water to hydrocarbon production relationships are to be expected depending on expected hydrocarbon production metrics (volume, type, geology etc.)?

To answer these questions effectively requires timely access to good data and robust data analysis. In the context of oilfield water management and the larger water marketplace, this presents a significant challenge. For example, water may be mispriced when information is hard to acquire, or when information provided by different parties is not correlated. A lack of transparency is a key reason behind pricing inefficiency in the market. There is a wealth of information in the public domain. Until now, the cost of acquiring information even when available in the public domain has been prohibitive. Additionally, a large number of variables must be collected in order to provide the essential information to describe a water asset. Each oilfield asset can have hundreds or even thousands of relevant data-points. These data points need to be captured, structured into a common data model, and mined, in order to be made useful, e.g., by way of estimating and predicting water demand (usage) and water production as well as managing water operations, for an exploration and production company. Moreover, there are many different public sources of water related asset data, and these data sets are constantly changing with thousands of new wells being drilled per month.

This is analogous to putting together a large puzzle while the pieces of the puzzle are changing in real time.

DETAILED DESCRIPTION

Figure 1:
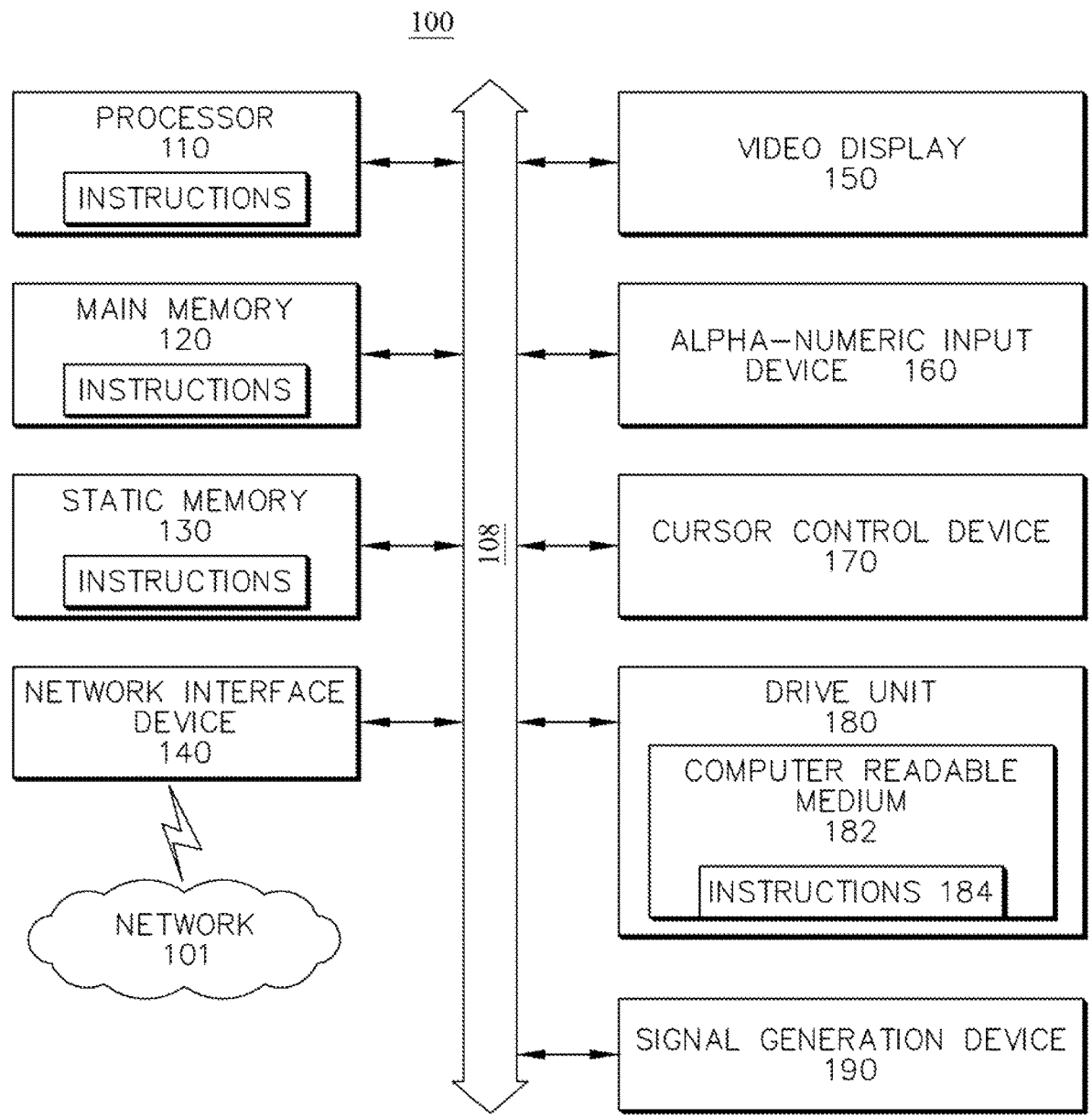
FIG. 1 shows an exemplary general computer system that includes a set of instructions for oilfield water management.

As described herein, historical oilfield water usage data, oilfield water production data and oilfield hydrocarbon production data can be used to predict oilfield water usage, oilfield water production, and oilfield hydrocarbon production. The data can be obtained from multiple sources including public sources and proprietary sources, and a process may be used to ensure that data used to predict usage and production is as accurate and complete as possible. The data may be historical data for one or more oilfield wells. Furthermore, the data may be historical data for one or more oilfield well types (i.e. oil, gas, disposal, or injection). A model can use the data to then predict water usage and water and hydrocarbon production for an oilfield well. The prediction(s) can be used, for example, to determine whether to implement a new proposed oilfield well, or approve continued use of an existing oilfield well. The prediction(s) can be used to alert and warn operators when preset thresholds or ranges will be exceed. In this way, the prediction(s) may inform decisions related to water operations and logistics pertaining to an existing or new oilfield well.

The oilfield water landscape is highly fragmented and defined by largely regional and local drivers. Because of these factors, a range of solutions can be brought to bear, but they need to be uniquely tailored to each specific type of water management problem. A water management solution that is effective in the Marcellus formation will likely not work in the Permian basin and vice-versa. Therefore, a portfolio of possible solutions is made available herein to allow operators to be world class water managers. What is common across all geographies is that the provision of a water asset management solution presented here enables the crafting of comprehensive water management strategies. As described herein, operators and their service provider partners are provided mechanisms to quickly access and analyze large relevant data sets to craft solutions to problems. The current disclosure therefore relates to a hydrocarbon well water management system which includes but is not limited to producing:

Estimates of existing well water demand/use
Estimates of existing well water production
Prediction of new well water demand/use
Prediction of new well water production
Prediction of well water to hydrocarbon production ratios
Prediction of future hydrocarbon production based on predicted well water to hydrocarbon ratios
Alert generation when any of the above estimates and predictions vary from expectations Additionally, although the description herein may refer to new proposed oilfield wells, the teachings herein also apply to existing oilfield wells. Operations for existing oilfield wells may be confirmed based on a historical hydrocarbon production or water production for the existing oilfield well.

Similarly, upon confirming accuracy of an identified model for a new proposed oilfield well, the identified model can be applied to data for the new proposed oilfield well. As a result, a new proposed oilfield well drill plan and operations can be implemented based on a result of the identified model that predicts water production of the new proposed oilfield well. The new proposed oilfield well can also be implemented or managed based on comparisons with other oilfield wells with similar characteristics.

Additionally, a water-to-hydrocarbon ratio can be used in or with the model to predict water production or hydrocarbon production. For example, a new proposed oilfield well can be implemented based on a water-to-hydrocarbon ratio for identified existing oilfield wells with similar characteristics, such as geography or depth etc. An existing oilfield well can be approved for continued use based on a water-to-hydrocarbon ratio identified for the existing well from past usage.

As described herein, data aggregation and machine learning or other data mining techniques are leveraged to process the historical oilfield water data and provide high value oilfield water information solutions to operators and service companies. As described herein, machine learning or other data mining algorithms are applied to water related data-sets in order to provide outcomes. The machine learning algorithms can be run on networked servers such as cloud-based servers, and results can be provided over a network to end-user devices such as smart phones and personal computers.

In view of the foregoing, the present disclosure, through one or more of its various aspects, embodiments and/or specific features or sub-components, is thus intended to bring out one or more of the advantages as specifically noted below.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

FIG. 1 is an illustrative embodiment of a general computer system, on which a method of oilfield water management can be implemented, and which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system 100 may operate in the capacity of a server or as a client user computer in a server-client user network environment, or as a peer computer system in a peer-to-peer (or distributed) network environment. The computer system 100 can also be implemented as or incorporated into various devices, such as a stationary computer, a mobile computer, a personal computer (PC), a laptop computer, a tablet computer, a wireless smart phone, a communications device, a server, or any other machine capable of executing a set of instructions (sequential or otherwise) that specify actions to be taken by that machine. The computer system 100 can be incorporated as or in a particular device that in turn is in an integrated system that includes additional devices. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 includes a processor 110. A processor for a computer system 100 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor for a computer system 100 is configured to execute software instructions in order to perform functions as described in the various embodiments herein. A processor for a computer system 100 may be a general-purpose processor or may be part of an application specific integrated circuit (ASIC). A processor for a computer system 100 may also be a microprocessor, a microcomputer, a processor chip, a controller, a microcontroller, a digital signal processor (DSP), a state machine, or a programmable logic device. A processor for a computer system 100 may also be a logical circuit, including a programmable gate array (PGA) such as a field programmable gate array (FPGA), or another type of circuit that includes discrete gate and/or transistor logic. A processor for a computer system 100 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 100 includes a main memory 120 and a static memory 130 that can communicate with each other via a bus 108. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory describe herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, bluray disk, or any other form of storage medium known in the art. Memories may be volatile or non-volatile, secure and/or encrypted, unsecure and/or unencrypted.

As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard/virtual keyboard or touch-sensitive input screen or speech input with speech recognition, and a cursor control device 170, such as a mouse or touch-sensitive input screen or pad. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. Sets of instructions 184 can be read from the computer-readable medium 182. Further, the instructions 184, when executed by a processor, can be used to perform one or more of the methods and processes as described herein. In a particular embodiment, the instructions 184 may reside completely, or at least partially, within the main memory 120, the static memory 130, and/or within the processor 110 during execution by the computer system 100.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

A computer that monitors conditions and inputs can be used to generate alerts when specified assets described herein deviate from normal ranges. More specifically, the normal ranges can be set by the output of a specified algorithm or assigned using a range calculated from historical observations. The machine can automatically alert the operator via a variety of communication protocols, including but not limited to: text message, email, or web application notification. The alerts can be sent when incoming data generates from expectations set by the algorithms using machine learning as described herein. For example, an operator may receive a text message on a designated smart phone advising that a preset range has been exceeded.

Operators may use their own internal descriptors for oilfield well data. The operators may also maintain data sets for groups of oilfield wells such that a model can be applied to data for a group of oilfield wells belonging to the operator. In this way, results from a model may be generated strictly for a group, such as the operator's group of oilfield wells, so that the benchmarks can be set within the specific group. Oilfield wells may be grouped for a particular owner-operator, or for a particular region, or for a particular geo-physical formation basis.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140.

Figure 2:
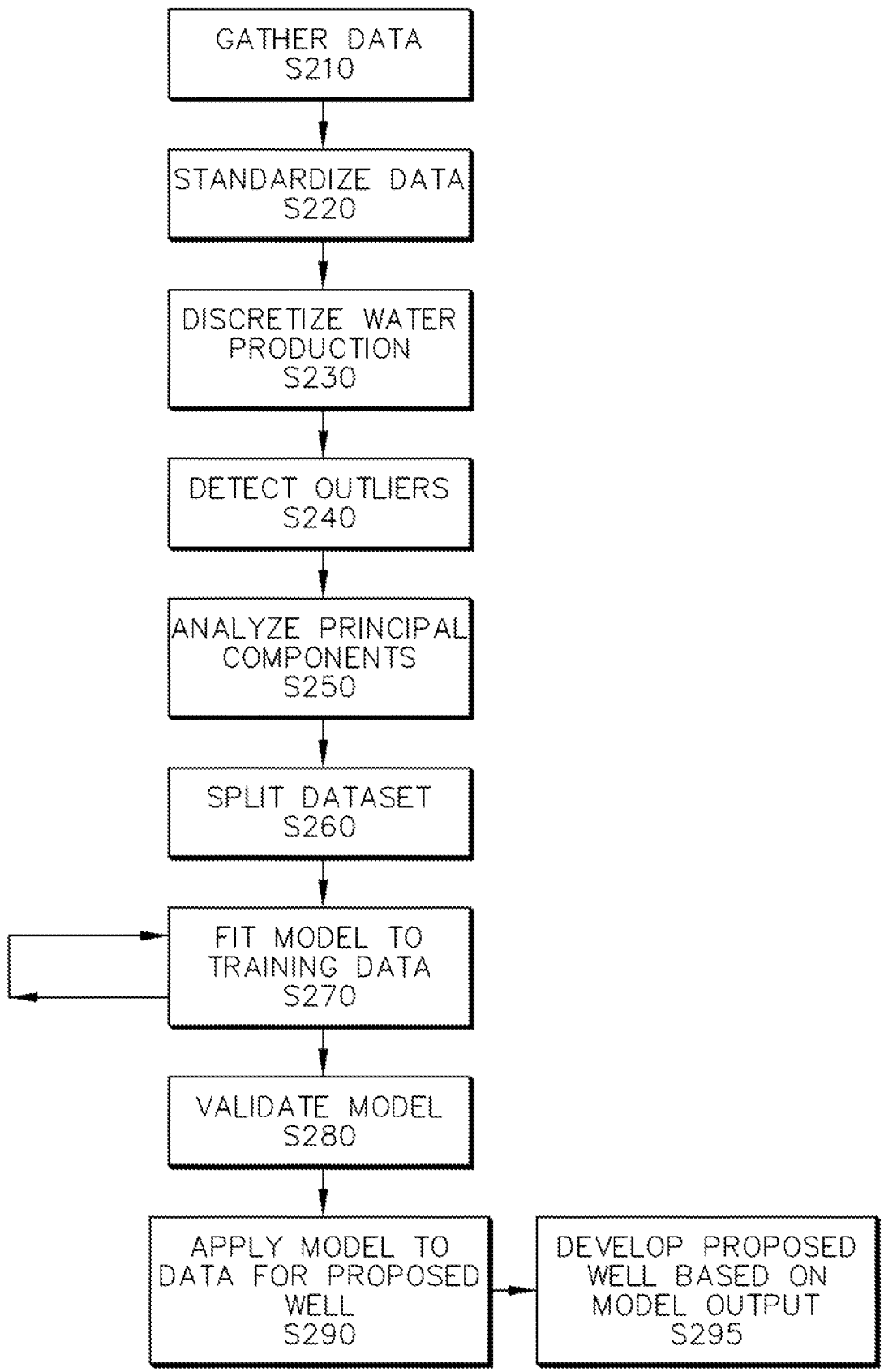
FIG. 2 shows a method for oilfield water management, according to an aspect of the present disclosure.

FIG. 2 shows a method for oil field water management. In FIG. 2, data is gathered at S210. The data gathered at S210 may be a large set of data stored in the cloud and managed on a hosted server. The data may include millions of details of water sources, water usage instances, water production instances, and characteristics such as water amounts, water quality, water rights, restrictions on water usage, and so on. For the purposes of the description below, the data will be referred to as water management data. Although a large proportion of this data exists today as public numerical data records collected by regulatory agencies, in the absence of and in addition to public data sources, this water management data repository could contain well and water operations data obtained directly from operators, data procured in the form of numerical and/or other unstructured or image derived data obtained from sensor networks monitoring water data supply chains.

As an exemplary illustration of the data in S210, a comprehensive data set of oilfield water assets and related observations is aggregated. The aggregated data described herein is referred to by the inventors named in the present application as Water Asset Intelligence™. A database of the aggregated data currently includes over 85 million water and hydrocarbon related observations for oil wells, gas wells, injection wells, and class-II saltwater disposal wells. Surface water rights information and deep-water aquifer well logs are also collected. These water source observations can also be added into the database. The database can include all of the active shale geographies in the continental United States, and hydrocarbon fields in other nations. The observations for each type of well can run in the tens of millions. Thus, the Water Asset Intelligence™ database can include exhaustive data for many types of geographies and circumstances, such that projections based on the Water Asset Intelligence™ database can be applied to almost any type of proposed well to be studied.

As an example of current record sizes, the dataset is comprised of approximately 14.6 million observations of water production and water used in well completions for 100,000 injection/disposal wells, 310,000 gas wells, and 875,000 oil wells. This large data set has been analyzed in order to identify strong water production and water usage relationships by geography, formation, wellbore length (i.e. vertical and horizontal), and well type (i.e. oil, gas, disposal, or injection). Outliers in this data set are also identified and excluded from analysis, thus increasing the predictive accuracy of the data. The strength of the relationships, and scale of the data-set, makes it highly predictive for estimating future water production and water demand (usage) among other parameters. For example, the database and analysis can be used for operators to estimate water demand (usage) and produced water volumes for drill plans. The database can be developed and mined to expand upon predictive capabilities and used to apply machine learning and other algorithms to develop automated and continually improving predictions. The data in the database can also be used to show evolving trends in relationships over time.

In addition to the aforementioned computer-readable public data, some data may be stored in a Portable Document Format (PDF), which depending upon the process in which it was created may not be machine-readable. Therefore, a novel data ingestion process was created which combines optical character recognition (OCR) and crowd-sourced human data entry.

Figure 9:
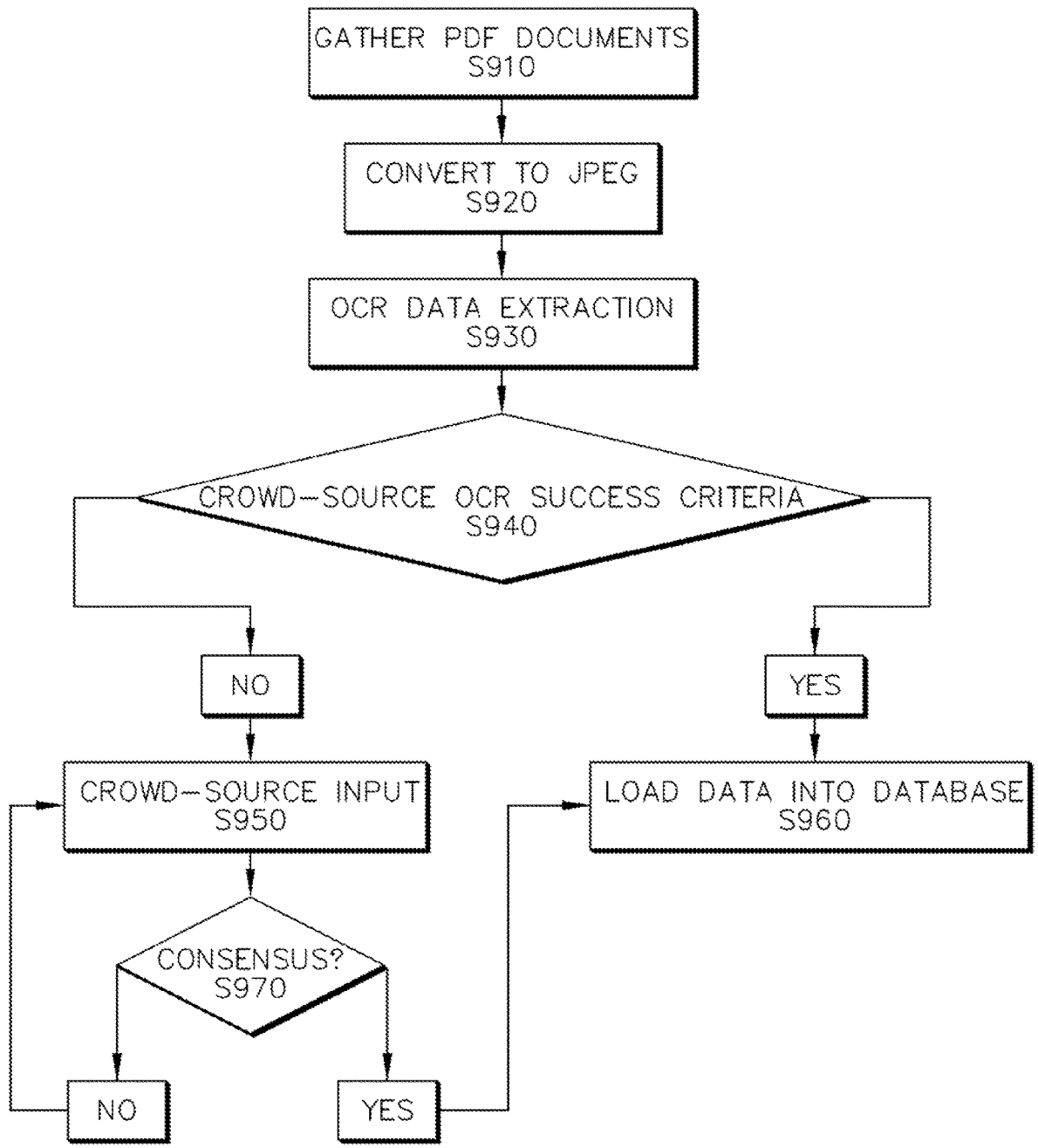
FIG. 9 shows a method for data extraction out of a Portable Document Format (PDF), according to an aspect of the present disclosure.

FIG. 9 shows an exemplary method for data extraction and ingestion for data found in a portable document format (PDF) document. At S920 a PDF is converted to a JPEG format. Subsequently, at S930 an attempt to use optical character recognition (OCR) to extract data tables out of the image. At S940 the OCR success is determined by comparing a crowd-sourced submission on the first page of the PDF document. More specifically, the first page of the PDF document contains a value that represents the sum of all the values found on subsequent pages. If the values extracted via OCR are within 90% of the aforementioned field, then the OCR extraction is deemed a success. However, if the OCR is unsuccessful (i.e. less than 90% of the total sum), at S950 the entire document is sent out to a crowd-sourcing platform where humans can input data manually. In order to verify accurate data entry, the same page may be tasked out twice. Once submitted, at S950 there is a check for consensus between the two submitted answers. If the two submitted answers are identical the task is considered as successful and at S960 the data is loaded into the database. However, if the tasks do not reach consensus, the page is sent out again until two submissions successfully reach consensus.

At S220, the data is standardized by converting data to a normal distribution, where the (large) data set is given a standard deviation of 1 and a mean of 0. At S230, the water management data is discretized. The water management data is parsed by the amount of water/day, such as 5 water bbls/day. In this way, all water management data for an asset can be associated with the same type of classification for use in production.

At S240, outliers in the data set are detected and removed. The outliers are detected using a probability density function and k-Nearest Neighbor clustering. In this way, the outliers with the most distance from a nearest neighbor can be removed to improve the consistency of values in the data set. This process is an exemplary method of noise or outlier rejection, and other methods can also be used. Water production datasets are standardized first. Standardization of data is a common requirement for many Machine Learning algorithms. Machine learning algorithms function optimally when the individual features follow closely a standard normal distribution (Gaussian with zero mean and unit variance). In addition, outliers are much easier to identify once features have been transformed to a normal distribution. For example water production values display an exponential distribution. Therefore, the data is normalized by subtracting the mean and dividing by the standard deviation. Since the residuals have a severe right skew, the natural log is taken.

At S250, data mining and pattern recognition techniques are used to elucidate a preliminary understanding of the data in order to inform what datasets to use in the machine learning process. As an example, principal components are analyzed using principal component analysis to find the most discriminative features of a dataset.

Machine learning is a branch of computer science focused on building computer systems that automatically improve with experience, i.e. the computing algorithm learns. Machine learning has broad implications across all industries and many technology applications.

The fundamental objective of Machine Learning is to uncover some new properties of a given dataset and then apply those properties to new datasets. This is why a common practice in machine learning is to evaluate an algorithm via split data-sets. In the present disclosure, one data-set is called the training set on which data relationships are learned, and one data-set is called the test set on which the relationships are tested. As an example, this process is leveraged to construct machine learning algorithms that predict water production for gas wells with 90% accuracy and water requirements for gas well completion with 94% accuracy. The methodology is described herein, and the algorithms are applied in a case study and then compared to actual real-world results. At S260, the data set is separated into a set of training data and a set of testing data.

Next, known water production values are converted from continuous to discrete variables by classifying the values into 5 bbls/day bins. The predictive inputs analyzed are the following: geospatial (latitude/longitude) coordinates, vertical depth, horizontal length (if applicable), and well age. The dataset is then arbitrarily split into a training set and testing set. All data manipulation process development is performed on a/the training set, and any algorithm or other data manipulation process is not provided any opportunity to learn from the testing set.

In addition to splitting up the dataset, a technique is also implemented known as bagging. Bagging is used to train multiple classifiers (an ensemble) without the requirement that all classifiers learn on an identical set of training data. This approach produces a number of different models, which introduces variety in a set of classifiers where it otherwise wouldn't exist. In addition to creating variety, other advantages to the bagging approach include:

Bagging is resistant to outliers and tends not to over-fit the data. Over-fitting occurs when the model fits more than just the signal in your data and actually fits the noise as well.

The training process can be computationally parallelized since training an individual learner is independent on the training of a previous learner.

This type of model can handle a large number of decision variables.

Once the algorithm was trained on the training set, its performance is assessed using cross-validation. Cross-validation is a technique for evaluating how a predictive model will perform on an independent test dataset. More specifically, the algorithm's performance is a function of how many times its output (predictions) correctly classifies the test set.

At S270, a model is fitted to the training data. A number of different classification models can be used to fit the training data, including but not limited to: Neural Networks, Logistic Regression, Support Vector Machines, Naïve Bayes, Nearest Neighbor, or Stochastic Gradient Descent. In addition to the aforementioned classification models, a RandomForest classification model can be fit to the set of training data using a grid search function to optimize the tunable parameters. The RandomForest model also uses the "bagging" technique described above. The grid search function iterates over all possible hyper-parameters and returns the model with the best precision, accuracy, and recall. The iterative running of the model at S270 can be entirely performed on and by a cloud server.

At S280, a model is validated by running the testing data through the model to quantify how well it can predict water production. If validated at S280, the model can then be used going forward to test data for newly proposed or existing wells at S290. At S295, a proposed well plan is developed based on the model output at S290.

As new records are acquired, the process can be performed again. In this way, the model can evolve so as to incorporate new observations. The model can generate alerts in response to detecting changes or evolving patterns. The alerts can be based on preset parameters, such as absolute or relative thresholds set for particular inputs or combinations of inputs, as well as changing or evolving input patterns.

These noted algorithms provide users with estimation, prediction and an alerting engine as it relates to water management. More specifically, the algorithms provide the ability to estimate water use and production, monitor water use and production, and/or send alerts when water use and production differs significantly from estimates. Additionally, algorithms can predict how much water is necessary to complete a well. The estimation/prediction machine can provide the alerts, which can then be sent to a water manager. The aforementioned alerts can be sent automatically and may be based on thresholds set by the water manager.

Loving Texas Case

To illustrate the implementation of the water management system, the algorithms described above are used to predict water demand (usage), production and construct a hypothetical drill management plan for a new well in Loving County, Texas. Loving County is located in the Delaware Basin, which is the western portion of the larger Permian Basin.

Figure 4:
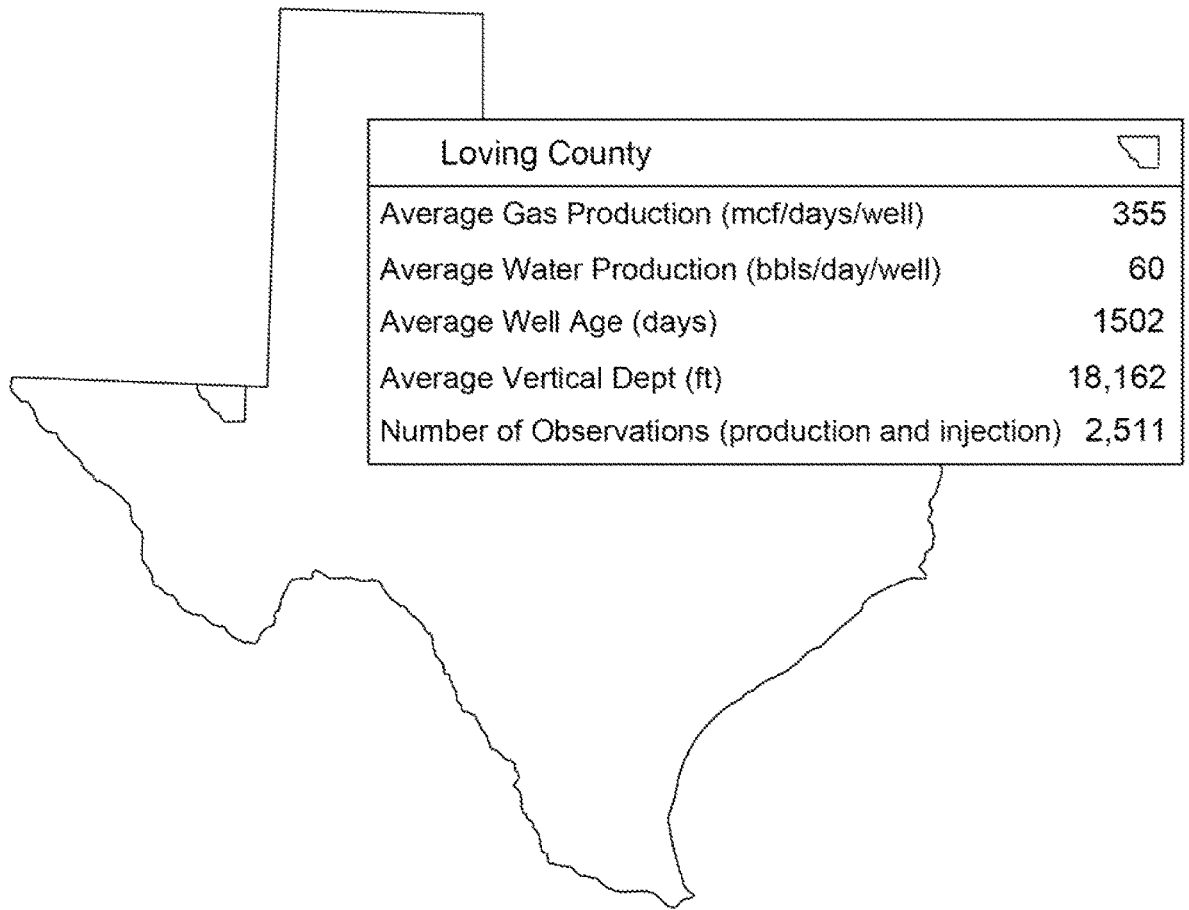
FIG. 4 shows exemplary statistics for water and gas production in an exemplary area, according to an aspect of the present disclosure.

Loving County has 227 regular producing gas wells, as of February 2014. General descriptive statistics for gas wells located in Loving County can be found in FIG. 4. Additionally, the average amount of water needed to complete a well in Loving County is 1,847,154 gallons.

Figure 6:
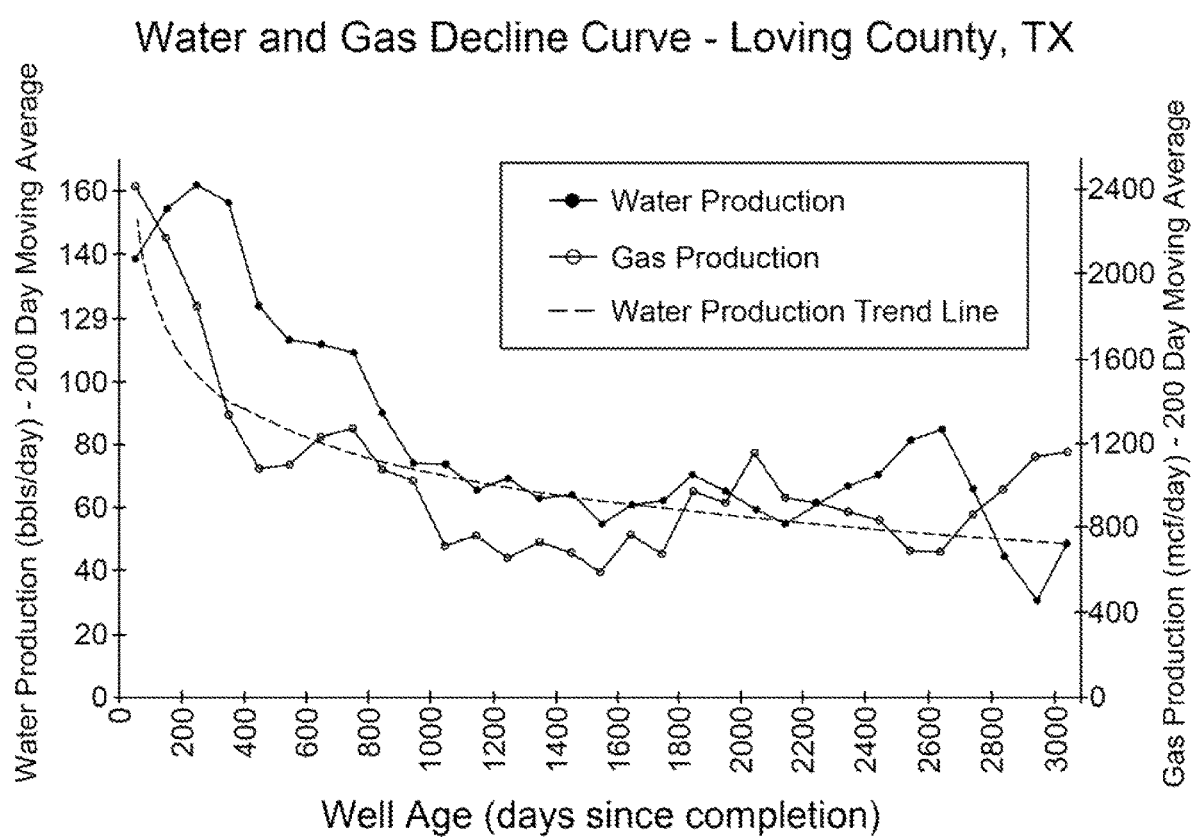
FIG. 6 shows a decline curve for water and gas in an exemplary area, according to an aspect of the present disclosure.

A production decline curve for Loving County was calculated using several thousand water and gas production records found in the water management system database (FIG. 6). Water and gas daily production records were binned into 100-day bins, and a 200-day moving average was applied on the water production values. According to the analysis, an average gas well in Loving County produces 145 to 160 barrels of water per day in its initial flow-back stage. Subsequently, the water production remains relatively consistent at 50 barrels per day after 900 days. This decline curve will serve as a benchmark to help determine the validity of the algorithm's predicted water production values.

The location of a hypothetical new well drill plan lies in North-central Loving County (31°56'13.1"N, 103°35'09.2"W). A hypothetical scenario is run for a gas well drilled at this location at a depth of 11,200 feet and with a horizontal length of 3,500 feet. The algorithm predicts that the total volume of water necessary to complete a well with these characteristics is 1,614,816 gallons. Furthermore, given specific well ages, the algorithm predicts a water production decline curve shown in FIG. 5.

In addition to the water production algorithm, a water usage algorithm is also trained to predict water volume required per well completion for Loving County. The inputs of the water demand (usage) algorithm include: geospatial (latitude/longitude) coordinates, vertical depth, horizontal length (if applicable), and completion date. In a similar fashion, completion water volumes are discretized into bins in order to make it a classification problem. A database currently includes approximately 102,000 well completion observations, which are split into a training set and testing set. The algorithm's performance is evaluated by how well it predicted the test set.

Algorithm performance was quantified using 3 scoring parameters: accuracy, precision, and recall. Accuracy represents the ability of the algorithm to make correct predictions. Precision is the ability of the algorithm not to label as positive a sample that is negative. Finally, recall is the ability of the algorithm to find all of the positive samples. When evaluated on the testing set, the water production algorithm predicted water production values with an accuracy of 90.58%, a recall of 91.86%, and a precision of 87.83%. Additionally, the water demand (usage) algorithm performed with an accuracy of 94.03%, a recall of 92.63%, and a precision of 93.38%.

Figure 3:
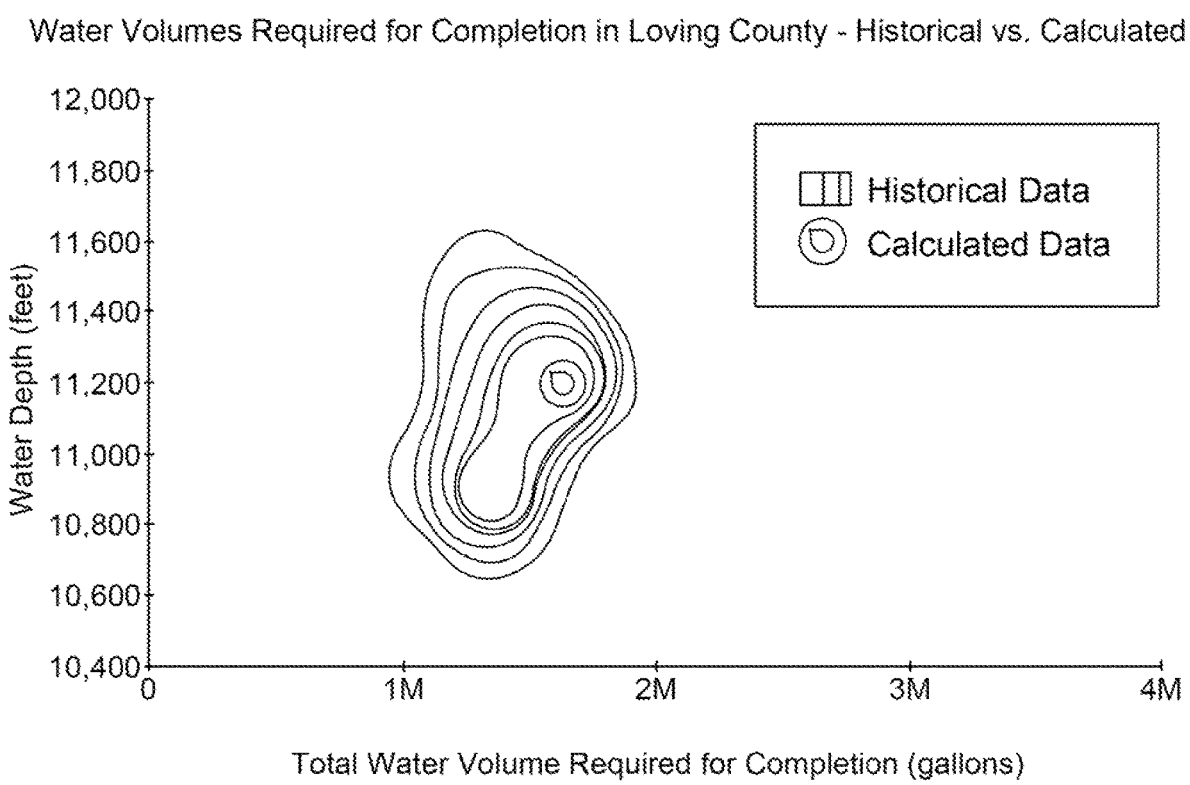
FIG. 3 shows a distribution of normalized data used for oilfield water management, according to an aspect of the present disclosure.

When compared to other wells within Loving County, the algorithm performs extremely well. The total volume of water required for completion predicted by the algorithm was lower than the average value for Loving County derived from historic observations. However, when compared to proximal wells that have similar characteristics (depth and horizontal length), the water volume falls well within the historically recorded distribution (FIG. 3).

Figure 5:
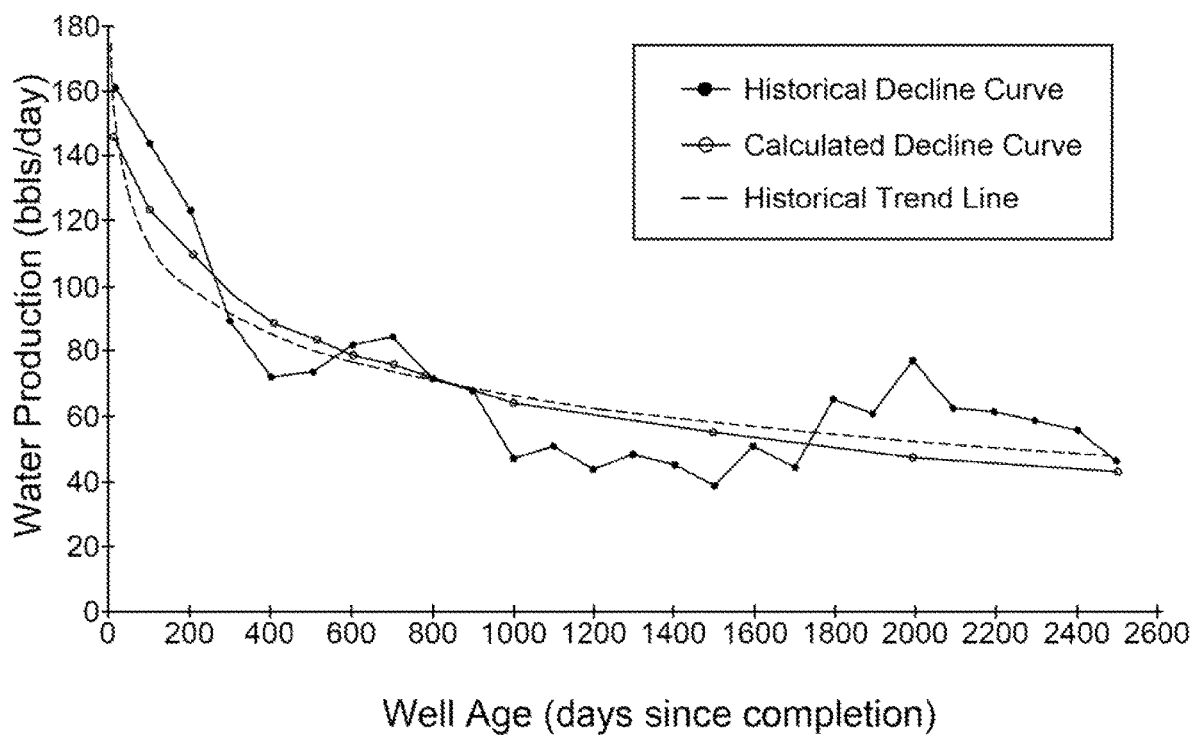
FIG. 5 shows a decline curve for water production in an exemplary area, according to an aspect of the present disclosure.

Furthermore, the calculated water production values are also very representative of wells in Loving County. To illustrate this fact, the Loving County decline curve is plotted alongside the decline curve derived from the algorithm (FIG. 5). The water production values calculated from the algorithm fall within the confidence intervals of the trend line (dashed blue lines) describing Loving County water production. For this reason, it is evident that the water production values predicted by the algorithm are consistent with historically recorded values in Loving County. Therefore, using historic water production records in Loving County as a benchmark, it is clear that the water production values predicted by the algorithm are contextually well-founded.

These algorithms can then be used to power an automated estimation/prediction machine. More specifically, the machine automatically monitors the water production or water usage of operator-specified assets. Monitoring may be performed directly via sensors or by using data provided by operators. If any of the specified assets deviate from normal ranges (determined by the aforementioned algorithms), the machine will automatically alert the operator via a variety of communication protocols, including but not limited to: text message, email, or web application notification.

Armed with this tool, oil and gas operators can more effectively plan around water assets while constructing a drill plan as well as compare and benchmark wells within their well asset portfolio. These algorithms have the potential to fundamentally change the water asset intelligence landscape; providing clarity for a resource that previously had low visibility. In addition, these algorithms will adapt over time as the number of water observations increase, since they can learn from new updated data.

Figure 7:
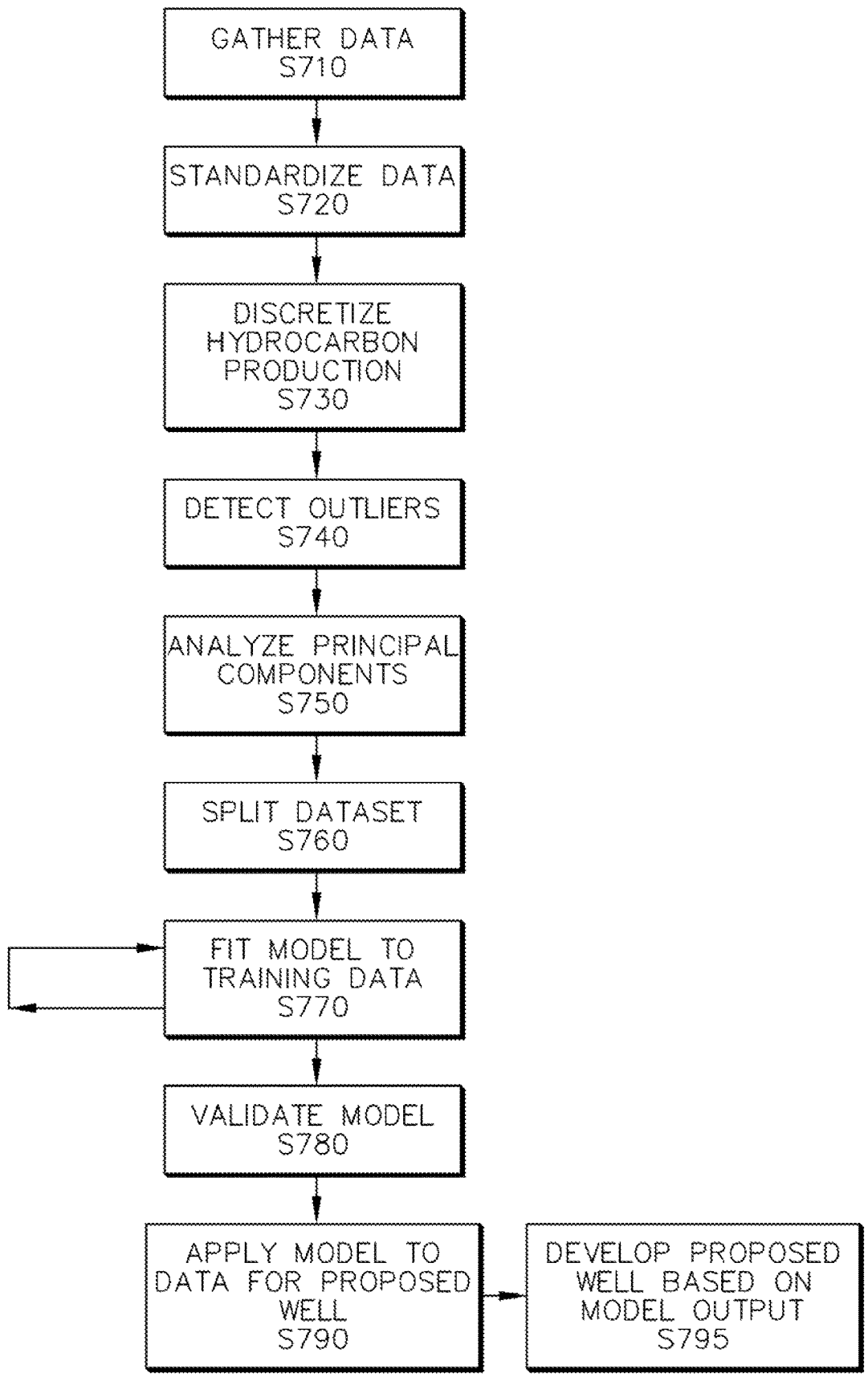
FIG. 7 shows a method for oilfield oil management, according to an aspect of the present disclosure.
Figure 8:
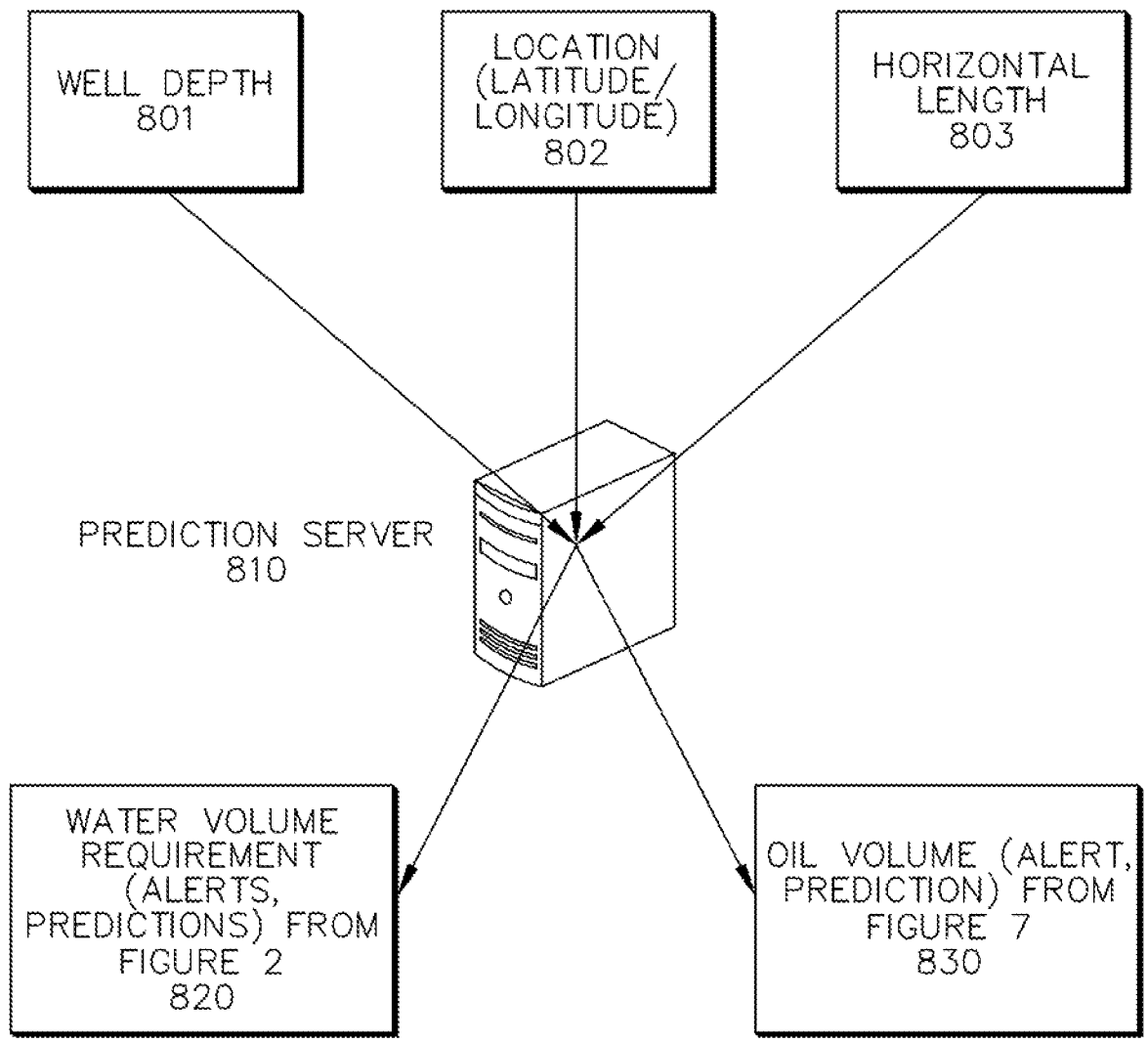
FIG. 8 shows a prediction computer, and inputs and outputs that can be used in order to generate predictions for water and oil output, according to an aspect of the present disclosure.

In FIG. 8, a prediction server 810 takes inputs such as well demographics including well depth 801, location (latitude/longitude etc.) 802, and horizontal length 803, and apply the well demographics to a model as in FIG. 2 and FIG. 7 in order to predict water volume requirements (FIG. 2), and hydrocarbon volume (FIG. 7) from a well. A prediction server 810 can take known oil output parameters to predict water usage requirements, and known water usage requirements to predict hydrocarbon output as in FIG. 7.

As described herein, many different uses can be made for a water prediction model. The water prediction model can be used for drill planning and development, for identifying required logistics of resources related to water management, for identifying requirements for water transport trucks, water tanks, water pipelines, and generally for allocation of water resources required for well completions. A water prediction model can also be used to estimate water-related costs throughout the lifecycle of a well, and to aid oil and gas operators during the formation of drill plans. The water prediction model can also help inform general drill planning and development considerations/operations.

Moreover, a water prediction model can be used for water production prediction and historical interpolation. The water prediction model can be used to enhance an ability to predict water production for active oil and gas wells, and to provide an ability to interpolate historical water production values for active wells. The model can also fill in the gaps that are prevalent in historical records by converting annual/biannual records to monthly water records. In this way, an algorithm can fill in data gaps from public databases that may include unreliable or incomplete datasets. As noted, the model can be used for allocating water resources required for well completions, and to help inform general drilling operations decisions for equipment and logistics management. Furthermore, the water volumes predicted by the model can be used as a proxy for oil/gas production. This application is especially helpful in the absence of real-time hydrocarbon production of a well.

Beneficiaries of the model include completion engineers, development engineers, water coordinators/manager, disposal/injection well operators, landmen, petroleum engineers, logistics/supply chain coordinators, and other types of water-related personnel.

Although oilfield water management has been described with reference to several exemplary embodiments, it is understood that the words that have been used are words of description and illustration, rather than words of limitation. Changes may be made within the purview of the appended claims, as presently stated and as amended, without departing from the scope and spirit of oilfield water management in its aspects. Although oilfield water management has been described with reference to particular means, materials and embodiments, oilfield water management is not intended to be limited to the particulars disclosed; rather oilfield water management extends to all functionally equivalent structures, methods, and uses such as are within the scope of the appended claims.

Additionally, the methods described herein with respect to water volume predictions can also be used to predict oil volumes when, e.g., water volume inputs are known. FIG. 7 shows a method for oil field oil management. In FIG. 7, data is gathered at S710. The data gathered at S710 may be a large set of data stored in the cloud and managed on a hosted server. The data may include millions of details of oil sources, oil production instances, and characteristics such as oil amounts, oil types, and so on. For the purposes of the description below, the data will be referred to as oil management data. The oil management data can be obtained from public data records, as well as records from operators, data procured in the form of numerical and/or other unstructured or image derived data obtained from sensor networks monitoring oil well production.

At S720, the data is standardized by converting data to a normal distribution, where the (large) data set is given a standard deviation of 1 and a mean of 0. At S730, the oilfield oil production data is discretized. The data is parsed by the amount of oil/day, such as 10 oil bbls/day. In this way, all oil production data for an asset can be associated with the same type of classification for use in production.

At S740, outliers in the data set are detected and removed. The outliers are detected using a probability density function and k-Nearest Neighbor clustering. In this way, the outliers with the most distance from a nearest neighbor can be removed to improve the consistency of values in the data set. This process is an exemplary method of noise or outlier rejection, and other methods can also be used.

At S750, data mining and pattern recognition techniques are used to identify a preliminary understanding of the data in order to inform what datasets to use in the machine learning process. As an example, principal components can be analyzed. Principal components are analyzed using principal component analysis to find the most discriminative features of a dataset.

At S760, the data set is separated into a set of training data and a set of testing data. At S770, a model is fitted to the training data. A number of different classification models can be used to fit the training data, including but not limited to those mentioned above for the water usage model. The iterative running of the model at S770 can be entirely performed on and by a cloud server.

At S780, a model is validated by running the testing data through the model to quantify how well it can predict water production. If validated at S780, the model can then be used going forward to test data for proposed wells at S790. At S795, a proposed well is developed based on the model output at 790. As described for FIG. 7, oil volume production can be predicted when water volumes are known and can be used as an input. The model and algorithms used to identify water production can thus be adapted to predict oil production when water production parameters are known.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of oilfield water management, comprising the steps of:
obtaining oilfield water data from publicly available data sources and sensor networks;
discretizing the oilfield water data into a plurality of oilfield water data groups, each oilfield water data group representing oilfield water data taken from a discrete and non-overlapping predetermined time period and representing at least one observation of water use or water production from a plurality of well completions;

identifying and excluding at least one outlier observation from the at least one observation of water use or water production to produce non-excluded oilfield water data;

identifying at least one most discriminative feature from a plurality of features of the non-excluded oilfield water data;

separating the non-excluded oilfield water data into training data and testing data;

generating a plurality of models based on the training data using a plurality of different classification models;

using a grid search function to identify a preferred model among the plurality of models, the preferred model exhibiting, among the plurality of models, at least one of higher precision, accuracy, and recall in modelling the training data;

running the preferred model on the testing data to confirm accuracy of the preferred model in estimating the oilfield water production of an existing oilfield well;

applying the preferred model to determine an estimated oilfield water production of the existing oilfield well, monitoring actual oilfield water production of the existing oilfield well by the sensor networks configured to monitor oilfield water production; and alerting an operator via electronic communication protocol when the actual oilfield water production of the existing oilfield well deviates from an estimated oilfield water production range.

2. The method of claim 1, further comprising applying the preferred model to implement a proposed oilfield well drilling operation; and allocating water resources required to complete the proposed oilfield well drilling operation based on a result of the preferred model.

3. The method of claim 2, wherein, when the preferred model is applied to implement the new proposed oilfield well drilling operation, the preferred model is used to project water usage requirements of the new proposed oilfield well drilling operation.

4. The method of claim 2, further comprising estimating water resources required to complete the new proposed oilfield well drilling operation based on a result of the preferred model.

5. The method of claim 1, wherein the oilfield water data includes data on water sources.

6. The method of claim 1, wherein the oilfield water data includes data on water usage instances.

7. The method of claim 1, wherein the oilfield water data includes data on water production instances.

8. The method of claim 1, wherein the oilfield water data includes data on water amounts.

9. The method of claim 1, wherein the preferred model is applied to water data for the existing oilfield well, and the existing oilfield well operation is approved for continued use based on predictions using the water-to-hydrocarbon ratio identified for the existing oilfield well.

10. The method of claim 1, wherein the plurality of features includes a cost of water over a lifecycle of an oilfield well.

11. The method of claim 1, wherein the plurality of features includes a type of an oilfield well.

12. The method of claim 1, wherein the plurality of features includes geological characteristics of an oilfield well.

13. The method of claim 1, wherein the plurality of features includes wellbore length of an oilfield well.

14. The method of claim 1, wherein the plurality of features includes geospatial characteristics of an oilfield well.

15. The method of claim 1, wherein the plurality of features includes age of an oilfield well.

16. The method of claim 1, wherein the oilfield water data comprises at least one of water usage data, water production data, water logistics and operations data, water characteristics data, and relative water-to-hydrocarbon production data.

17. The method of claim 1 further comprising applying the preferred model to implement operations for a group of existing or proposed oilfield wells.

18. A method of oilfield hydrocarbon production management, comprising:

obtaining oilfield hydrocarbon production data from publicly available data sources, and networks of sensors configured to monitor hydrocarbon production;

discretizing the oilfield hydrocarbon production data into a plurality of oilfield hydrocarbon production data groups, each oilfield hydrocarbon production data group representing oilfield hydrocarbon production data taken from a discrete and non-overlapping predetermined time period and representing at least one observation of oilfield hydrocarbon production from a plurality of well completions;

identifying and excluding at least one outlier observation from the at least one observation of oilfield hydrocarbon production to produce non-excluded oilfield hydrocarbon production data;

identifying at least one most discriminative feature from a plurality of features of the non-excluded oilfield hydrocarbon production data;

separating the non-excluded oilfield hydrocarbon production data into training data and testing data;

generating a plurality of models based on the training data using a plurality of different classification models;

using a grid search function to identify a preferred model among the plurality of models, the preferred model exhibiting, among the plurality of models, at least one of higher precision, accuracy, and recall in modelling the training data;

running the preferred model on the testing data to confirm accuracy of the preferred model in predicting oilfield hydrocarbon production;

predicting oilfield hydrocarbon production of proposed oilfield well or an existing oilfield well by applying the preferred model; and implementing a proposed oilfield well drilling operation or approving an existing oilfield well operation based on the prediction of the preferred model.

19. The method of claim 18, wherein the preferred model is applied to data for the existing oilfield well, and the existing oilfield well operation is approved for continued use further based on a water-to-hydrocarbon ratio identified for the existing oilfield well.

20. A system of monitoring oilfield water production by predicting oilfield water production, comprising:

a database of oilfield water data;

sensor networks configured to monitor oilfield water production; and a computer system with a processor for executing instructions stored in a computer-readable medium for:
  obtaining oilfield water data from publicly available data sources, and the sensor networks,
  storing the oilfield water data in the database,
  discretizing the oilfield water data into a plurality of oilfield water data groups, each oilfield water data group representing oilfield water data taken from a discrete and non-overlapping predetermined time period and representing at least one observation of water use or water production from a plurality of well completions,
  identifying and excluding at least one outlier observation from the at least one observation of water use or water production to produce non-excluded oilfield water data,
  identifying at least one most discriminative feature from a plurality of features of the non-excluded oilfield water data,
  separating the non-excluded oilfield water data into training data and testing data,
generating a plurality of models based on the training data using a plurality of different classification models;
using a grid search function to identify a preferred model among a plurality of models, the preferred model exhibiting, among the plurality of models, at least one of higher precision, accuracy, and recall in modelling the training data,
running the preferred model on the testing data to confirm accuracy of the preferred model in estimating oilfield water production of an existing oilfield well, applying the preferred model to determine estimated oilfield water production of the existing oilfield well,
receiving data of actual oilfield water production of the existing oilfield well from the at least one sensor, and
alerting an operator via electronic communication protocol when the actual oilfield water production of the existing oilfield well deviates from an estimated oilfield water production range.

21. A system for predicting oilfield hydrocarbon production, comprising:
  a database of oilfield hydrocarbon production data; and
  a computer system with a processor for executing instructions stored in a computer-readable medium for
    obtaining oilfield hydrocarbon production data from publicly available data sources, and networks of sensors configured to monitor hydrocarbon production,
    storing the oilfield hydrocarbon production data in the database,
    discretizing the oilfield hydrocarbon production data into a plurality of oilfield hydrocarbon production data groups, each oilfield hydrocarbon production data group representing oilfield hydrocarbon production data taken from a discrete and non-overlapping predetermined time period and representing at least one observation of oilfield hydrocarbon production from a plurality of well completions,
    identifying and excluding at least one outlier observation from the at least one observation of oilfield hydrocarbon production to produce non-excluded oilfield hydrocarbon production data,
    identifying at least one most discriminative feature from a plurality of features of the non-excluded oilfield hydrocarbon production data,
    separating the non-excluded oilfield hydrocarbon production data into training data and testing data,
generating a plurality of models based on the training data using a plurality of different classification models;
    using a grid search function to identify a preferred model among the plurality of models, the preferred model exhibiting, among the plurality of models, at least one of higher precision, accuracy, and recall in modelling the training data,
    running the preferred model on the testing data to confirm accuracy of the preferred model in predicting oilfield hydrocarbon production, and
    predicting oilfield hydrocarbon production of a proposed oilfield well or an existing oilfield well by applying the preferred model.

\* \* \* \* \*